(12) United States Patent
Polevoy et al.

(10) Patent No.: US 12,254,107 B2
(45) Date of Patent: Mar. 18, 2025

(54) ORCHESTRATION OF ADMINISTRATIVE UNIT MANAGEMENT

(71) Applicant: CAYOSOFT, INC., Westerville, OH (US)

(72) Inventors: Andrey Mikhaylovich Polevoy, Khimki (RU); Robert John Bobel, III, Westerville, OH (US)

(73) Assignee: CAYOSOFT, INC., Westerville, OH (US)

( * ) Notice: Subject to any disclaimer, the term of this patent is extended or adjusted under 35 U.S.C. 154(b) by 322 days.

(21) Appl. No.: 17/667,292

(22) Filed: Feb. 8, 2022

(65) Prior Publication Data
US 2022/0253542 A1    Aug. 11, 2022

Related U.S. Application Data

(60) Provisional application No. 63/147,433, filed on Feb. 9, 2021.

(51) Int. Cl.
*G06F 21/62*    (2013.01)
*G06F 21/60*    (2013.01)

(52) U.S. Cl.
CPC ........ *G06F 21/6218* (2013.01); *G06F 21/604* (2013.01); *G06F 2221/2141* (2013.01)

(58) Field of Classification Search
CPC ............... G06F 21/6218; G06F 21/604; G06F 2221/2141
See application file for complete search history.

(56) References Cited

U.S. PATENT DOCUMENTS

| 7,350,226 B2 | 3/2008 | Moriconi et al. |
| 7,568,217 B1 | 7/2009 | Prasad et al. |

(Continued)

FOREIGN PATENT DOCUMENTS

| KR | 20130077433 A | 7/2013 |
| WO | 2019/005512 A1 | 1/2019 |
| WO | 2020/167928 | 8/2020 |

OTHER PUBLICATIONS

European Patent Office (ISA/EP), International Search Report and Written Opinion of the International Searching Authority, International Application No. PCT/US2022/015677, 12 pages, May 23, 2022.

(Continued)

*Primary Examiner* — Luu T Pham
*Assistant Examiner* — Paul J Skwierawski
(74) *Attorney, Agent, or Firm* — Thompson Hine LLP

(57) ABSTRACT

Methods, systems, and computer program products for implementing an administrative unit management process. An object membership request that includes a membership access change for an object for one or more administrative units of a plurality of administrative units is received at a management service from a client device. Membership evaluation information associated with the object is obtained from a directory service for the plurality of administrative units. A membership change action is determined based on the membership evaluation information. Instructions are provided to at least one administrative unit of the plurality of administrative units to implement the membership change action. A membership change notification is sent to the client device.

17 Claims, 11 Drawing Sheets

(56) References Cited

U.S. PATENT DOCUMENTS

| | | | |
|---|---|---|---|
| 9,137,263 B2 | 9/2015 | Chari et al. | |
| 9,411,977 B2 | 8/2016 | Buss | |
| 10,554,615 B2 | 2/2020 | Teverosky et al. | |
| 10,715,514 B1 | 7/2020 | Threlkeld | |
| 2006/0156020 A1* | 7/2006 | Minium | G06F 21/6218 713/182 |
| 2006/0294578 A1* | 12/2006 | Burke | G06F 21/604 726/2 |
| 2007/0283443 A1* | 12/2007 | McPherson | G06F 21/6218 726/28 |
| 2014/0059651 A1 | 2/2014 | Luster et al. | |
| 2014/0196115 A1* | 7/2014 | Pelykh | H04L 63/08 726/4 |
| 2014/0289207 A1* | 9/2014 | Moloian | G06F 16/2365 707/687 |
| 2015/0012966 A1* | 1/2015 | Tandon | G06F 21/00 726/4 |
| 2016/0359965 A1 | 12/2016 | Murphy et al. | |
| 2019/0334917 A1* | 10/2019 | Demmler | G06F 21/6218 |
| 2020/0344212 A1 | 10/2020 | Devireddy et al. | |
| 2021/0329037 A1* | 10/2021 | O'Byrne | H04L 63/102 |

OTHER PUBLICATIONS

Sandu, R.S., "Role-Based Access Control Models," IEEE Computer Society, IEEE, USA, vol. 29, No. 2, pp. 38-47, Feb. 1996.

Roberts, T., "An introduction to Azure AD administrative units," https://4sysops.com/archives/an-introduction-to-azure-ad-administrative-units/, 18 pages, Jan. 6, 2021.

"Synchronizing group membership," Cloudera, Inc., https://docs.cloudera.com/management-sole/cloud/user-management/lopics/f, 2 pages, Feb. 24, 2021.

* cited by examiner

CONFIGURE MUTUALLY EXCLUSIVITY BETWEEN ADMINISTRATIVE UNITS

USER OBJECT MEMBERSHIP MANAGEMENT COMMAND

FIG. 9

USER OBJECT MEMBERSHIP MANAGEMENT COMMAND WITH CONFLICT RESOLUTION MESSAGE

ORCHESTRATION OF ADMINISTRATIVE UNIT MANAGEMENT

CROSS-REFERENCE TO RELATED APPLICATIONS

This application claims the benefit of U.S. Provisional Application Ser. No. 63/147,433 filed Feb. 9, 2021, which is incorporated herein in its entirety.

TECHNICAL FIELD

The present invention generally relates to computers and computer software, and more specifically, to methods, systems, and computer program products for implementing an administrative unit management process.

BACKGROUND

Modern computing environments often include a directory service which is used to control access to network resources using objects and object properties to represent, or as a metaphor for, a user (a user object) or groups of users (a group object). Object properties can represent data associated with a specific object (e.g., user objects can have username and password properties, and group objects can have a membership property that may contain a list of user objects that are members of the group). Group object members are often used to identify a list of objects, to serve as an administrative scope, to which an administrative activity can be applied. Further, a directory service can also be used to manage object memberships in or between sets of groups objects that participate in the computing environment (e.g., creating a group and assigning of memberships to define administrative scopes such as identify users in specific locations or offices, etc.).

The directory service may also function as a centralized mechanism to authenticate entities (e.g., verify user object usernames and passwords) and use the entities' object memberships (e.g., memberships in groups) to authorize or restrict the entities from performing certain computing tasks or accessing specific network resources (e.g., not allowing a foreign national to access a military contract document or not allow an individual outside a human resources department to access certain sensitive human resources documents, or only allowing certain administrators to access or modify certain files, etc.). Each object membership may be authenticated with the directory service and may then be used to access shared resources over a network without authenticating to each individual shared resource. For example, the directory service may enable a user to log into a computer that the user has not previously accessed by providing credentials that are recognized by the directory service. The user may use the computing device to access network resources, such as shared data storage or printers, without providing the credentials to the network resource.

However, in some cases group membership management is a time-consuming, manual, and often error-prone process that can result in costly security and compliance failures. Some modern directory services have additional methods for defining administrative scopes such as roles, managed unites, and administrative units, all of which have memberships that serve as administrative scopes.

SUMMARY

The current disclosure discloses certain methods, systems, and computer program products for providing management and enforcement of mutually exclusive object memberships in or between sets of administrative units so that a member object, or potential member object, may have membership in only one particular administrative unit within a set of mutually exclusive administrative units and when needed membership and in one or more administrative units that do not have mutually exclusive memberships requirements. In embodiments of the invention, a method for implementing an administrative unit management process is described. The method may include receiving, at a management service from a client device, an object membership request that includes a requested membership access change for an object for one or more administrative units of a plurality of administrative units. The method may further include obtaining, at the management service, membership evaluation information associated with the object for the plurality of administrative units. The method may further include determining, at the management service, a requested membership change action based on the membership evaluation information. In response to determining an approved membership change action, the method may further include providing instructions to at least one administrative unit of the plurality of administrative units to implement the requested membership change action. The method may further include sending a membership change notification to the client device.

These and other embodiments can each optionally include one or more of the following features.

In some embodiments of the invention, determining membership change action based on the membership evaluation information includes determining to delegate administrative rights to the one or more objects for one or more administrative units. In some embodiments of the invention, determining membership change action based on the membership evaluation information is based on permission roles and assigning permission delegation to a user. In some embodiments of the invention, determining membership change action based on the membership evaluation information includes determining to remove access to one of the administrative units for the object. In some embodiments of the invention, determining membership change action based on the membership evaluation information includes determining to provide access to another administrative unit for the object.

The method may further include obtaining, at the management service, membership evaluation information associated with the object and/or for the plurality of administrative units with mutually exclusive administrative unit memberships and without mutually exclusive administrative unit membership that may be used by the management service to affect a requested membership access change.

In some embodiments of the invention, the membership change action includes a membership conflict between the object and memberships associated with the object corresponding to another administrative unit.

In some embodiments of the invention, displaying on a user interface at the client device a membership conflict resolution notification for the membership conflict. In some embodiments of the invention, in response to receiving the membership change action, the management service is configured to distribute the membership change action to each of the plurality of administrative units.

In some embodiments of the invention, the membership evaluation information is obtained from a directory service, a file, memory cache, or a management service configuration database. In some embodiments of the invention, the membership evaluation information is obtained during, or prior to, the evaluation of the membership change actions.

In some embodiments of the invention, the method further includes tracking membership change results associated with the membership change action in a management configuration database. In some embodiments of the invention, the method further includes reversing one or more of the membership change actions to each of the plurality of administrative units based on the tracked membership change results.

In some embodiments of the invention, the object includes a user account object, a computer account object, one of a group of objects, an object container object, or a combination thereof.

In some embodiments of the invention, the plurality of administrative units each include an administrative object that defines a set of member objects to which membership change actions are configured to be applied and/or enforced.

In some embodiments of the invention, the management service is hosted by a cloud-based management server and accessed by the client device based on the client device including correct permissions.

In embodiments of the invention, a method for implementing administrative unit management process. The method includes, at an electronic device having a processor, receiving, at a management service, an object membership revision request from a client device. The object membership revision request may include a list of objects and a list of associated qualities of the objects. The method may further include accessing a list of object qualifications from an administrative unit. The method may further include comparing the received object qualities to object qualifications. The method may further include based on the comparing step, adjusting the administrative unit to at least one of add or remove an object, or adjust an authorization of an object.

These and other embodiments can each optionally include one or more of the following features.

In some embodiments of the invention, adjusting the administrative unit to at least one of add or remove an object or adjust an authorization of an object includes determining to delegate administrative rights to a particular object for the administrative unit. In some embodiments of the invention, adjusting the administrative unit to at least one of add or remove an object or adjust an authorization of an object includes determining to delegate administrative rights to a particular object for the administrative unit. In some embodiments of the invention, adjusting the administrative unit to at least one of add or remove an object or adjust an authorization of an object includes determining to remove access to the administrative unit for a particular object.

In embodiments of the invention, a computing apparatus for implementing administrative unit management process. The computing apparatus includes one or more processors, at least one memory device coupled with the one or more processors, and a data communications interface operably associated with the one or more processors. The at least one memory device contains a plurality of program instructions that, when executed by the one or more processors, cause the including apparatus to perform operations. The operations may include receiving, at a management service from a client device, an object membership request that includes a requested membership access change for an object for one or more administrative units of a plurality of administrative units. The operations may further include obtaining, at the management service, membership evaluation information associated with the object for the plurality of administrative units. The operations may further include determining, at the management service, a requested membership change action based on the membership evaluation information. In response to determining an approved membership change action, the operations may further include providing instructions to at least one administrative unit of the plurality of administrative units to implement the requested membership change action. The operations may further include sending a membership change notification to the client device.

In embodiments of the invention, a non-transitory computer storage medium encoded with a computer program, the computer program including a plurality of program instructions that when executed by one or more processors cause the one or more processors to perform operations. The operations may include receiving, at a management service from a client device, an object membership request that includes a requested membership access change for an object for one or more administrative units of a plurality of administrative units. The operations may further include obtaining, at the management service, membership evaluation information associated with the object for the plurality of administrative units. The operations may further include determining, at the management service, a requested membership change action based on the membership evaluation information. In response to determining an approved membership change action, the operations may further include providing instructions to at least one administrative unit of the plurality of administrative units to implement the requested membership change action. The operations may further include sending a membership change notification to the client device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 9 illustrates an example screenshot of a management administrative user interface for receiving a conflict resolution message, according to embodiments of the invention.

DETAILED DESCRIPTION

Figure 1:
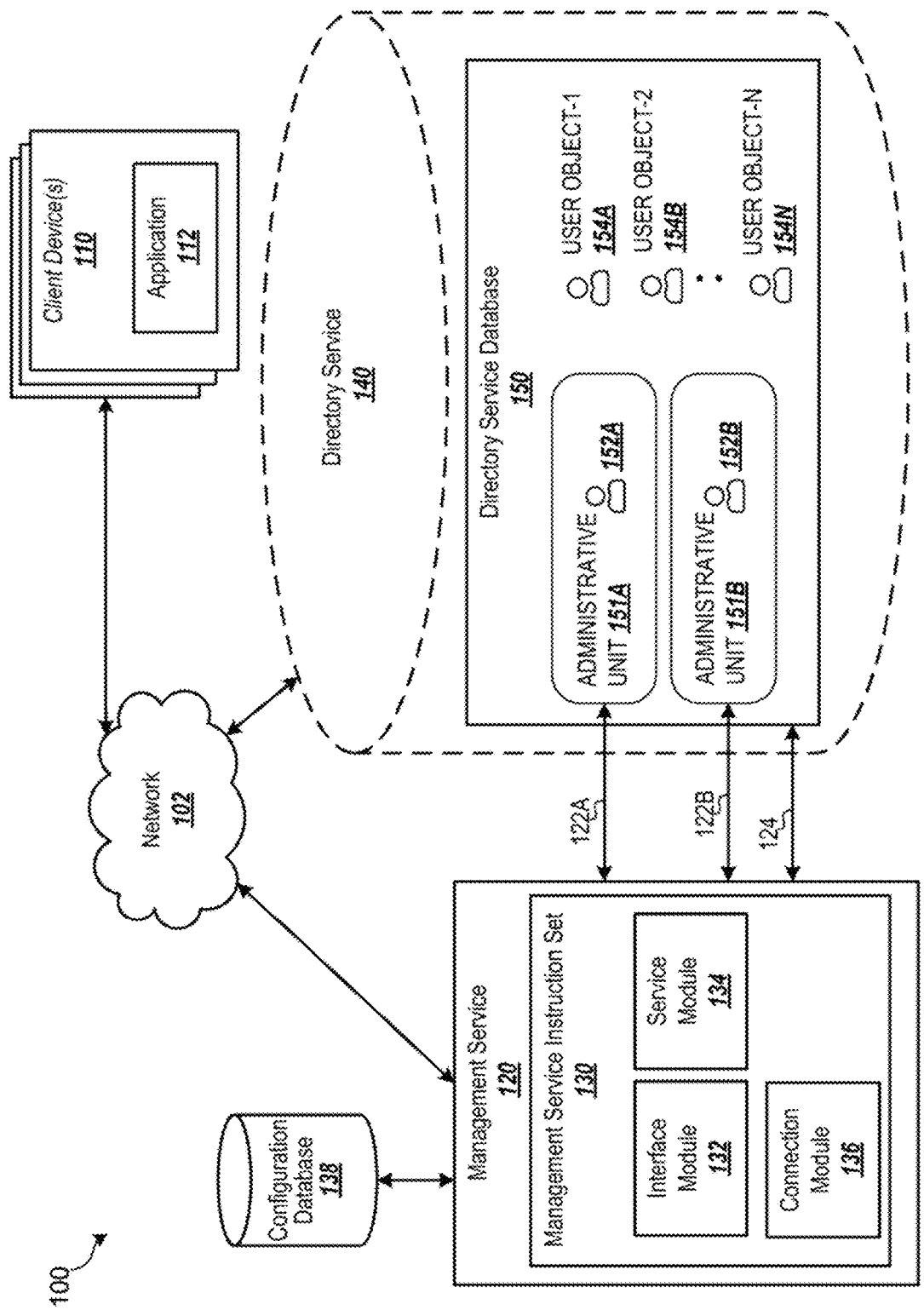
FIG. 1 illustrates an exemplary environment for implementing an administrative unit management process, according to embodiments of the invention.

Information technology (IT) administrators seek automated and dynamic computing environments to keep groups of users and their respective access across groups accurate across directory services and hybrid environments in order to help sustain key security, compliance and efficiency goals. Group membership management is a time-consuming, manual, and often error-prone process that can result in costly security and compliance failures. Thus, improved methods, systems, and computer program products are disclosed herein for providing orchestration of management for enforcement of mutually exclusive object memberships in or between sets of administrative units so that a member object or potential member object may have membership in only one particular administrative unit from a plurality of administrative units with mutually exclusive memberships.

The technology disclosed herein is related to systems and methods for implementing an administrative unit management process as a feature in an identity and access management enterprise platform system. The management service provides an IT administrator with the possibility of automatically adding and/or removing members based on flexible and granular membership rules with or without human involvement, reducing complexity and enabling IT administrators to concentrate on what is most important, while sustaining key security, compliance, and efficiency goals. An administrative unit management process may utilize one or more management services that are in communication with the client devices, configuration database(s)/engine(s), directory service(s), and the like. The administrative unit management process integrates a process as a single user interface (UI) presented on client device(s) that is configured for easy-to-use membership management that allows distribution list, application, and data owners and administrators to manage who has access to their respective resources.

In some implementations, a management service instruction set triggers dynamic membership updates by events, such as user provisioning and deprovisioning, or executes updates on a schedule. As users join, change roles, or depart, memberships are automatically and dynamically updated, keeping groups, roles or administrative units accurate and maintaining critical IT system, security, and compliance. In some implementations, the administrative unit management process can monitor unwanted membership across the computing environment, both in a directory and on system wide enterprise solutions (e.g., email software services), to ensure only authorized employees are granted access to sensitive information or are within the scope of some administrative activity.

In some implementations, a management service instruction set can automatically create, modify, and/or control the membership of or delete one or more administrative unit by analyzing data from a plethora of sources, including potential member objects attributes such as its organizational or geographical properties, a similar object's attributes, an objects presence in or references in Microsoft Azure Active Directory®, Microsoft Active Directory®, or an Active Directory Organizational Unit container object, permission sets, external databases, or LDAP directory(s).

FIG. 1 is an example environment 100 for implementing an administrative unit management process, according to embodiments of the invention. The example environment 100 includes one or more client device(s) 110, a management service 120, and a directory service 140 that includes directory service database 150, that communicate over a data communication network 102, e.g., a local area network (LAN), a wide area network (WAN), the Internet, a mobile network, or a combination thereof.

The one or more client device(s) 110 (e.g., a device used by an object or an object membership requestor, such as an IT administrator) can include a desktop computer, a laptop computer, a server, or a mobile device, such as a smartphone, tablet computer, and/or other types of mobile devices. The one or more client device(s) 110 includes and/or be able to access or use applications, such as the application 112, for managing an object membership request to/from the management service 120, as well as direct access to the directory service database 150 in the directory service 140. The one or more client device(s) 110 can include and/or be able to access or use other applications.

The one or more client device(s) 110 initiates an object membership request by a requestor via application 112. The object membership request may include instructions that include one or more lists to add/move/remove/modify an object/user between object memberships (e.g., location (London), department (Engineering), etc.). The set of objects may or may not have mutual exclusivity with other administrative units (e.g., management scopes) to which roles, rules, or orchestrations can be applied and enforced. The one or more client device(s) 110 may be utilized by a user (e.g., an IT administrator) to review membership change notifications and/or results. An example management administrative user interface is further discussed herein with reference to management administrative user interfaces of FIGS. 6-10.

The management service 120 (e.g., hosted on an administrative management server) manages object membership requests received from application 112 from the one or more client devices 110. The management service 120 may be a personal computing device, tablet computer, thin client terminal, smart phone, cloud-computing entity, and/or other such computing device. The management service 120 may also be referred to herein as the "Administrative unit server" (e.g., for a locally based server, such as located at the client site for the IT administrator), or a "Management Virtual Server" (e.g., for a cloud-based platform). The management service 120 includes management service instruction set 130 that performs an administrative unit management protocol according to processes described herein.

The management service instruction set 130 may include an interface module 132, a service module 134, and a connection module 136. The interface module 132 may be configured to host a web portal (or console) used for management tasks by interfacing with the one or more client device(s) 110 and displaying information, such as virtual administrative management units. The service module 134 may be configured to performs all tasks on behalf of users (IT administrators for object membership requests) making changes from the interface module 132 via one or more client device(s) 110, or automatically through orchestrations (e.g., one or more tasks that a software program will perform automatically over a scope). The connection module 136 is a component of the management service 120 that creates and maintains connection (e.g., via a communication protocol) to the directory service 140 (or other services).

In an exemplary implementation, a management service 120 receives an object membership request that may be entered by a user at client device 110 via a management administrative user interface. The object membership request may include a membership access change for an object for one or more administrative units of a plurality of administrative units. For example, a client device (e.g., client device 110 via application 112) sends a request to the management service 120 to add/move/remove an object/user between memberships (e.g., location (London), department (Engineering), etc.).

In some embodiments of the invention, the set of objects may or may not have mutual exclusivity with other management scopes to which roles, rules, or orchestrations can be applied and enforced by management service 120 in communication with the directory service database 150 of the directory service 140 via communication protocols. For example, communication protocol 122A and 122B are utilized by the management service to communicate with and send commands to manage administrative unit 151A and administrative unit 151B, respectively. Additionally, communication protocol 124 are utilized by the management service to communicate with (e.g., administrative unit orchestration and change logging) the user objects 154A-154N (also referred to herein as user objects 154). The management service 120 may also access configuration information from a previous request and/or store definitions and configurations of virtual administrative unit(s), orchestrations, roles, configuration data, and the like in the configurations database 138.

The directory service 140 may be a shared information infrastructure for locating, managing, administering, and organizing computing objects of a computing environment 100. The directory service 140 may include one or more domains to organize the computing objects such as the directory service database 150. The computing objects may represent computing resources such as users (e.g., user accounts), groups, devices (e.g., desktops, printers), data storage objects (e.g., files, records), other objects, or a combination thereof. Each computing object may be associated with identification data (e.g., object name, object ID, and type), access control data (e.g., permissions), membership data (e.g., group membership), other data, or a combination thereof. In one example, directory service 140 may function as a centralized authentication mechanism that enables one or more client devices 110 to access or use computing objects within computing environment 100. Each user or device (e.g., client device 110) may authenticate with directory service 140 to access shared resources over a network without individually authenticating to each shared resource.

Directory service 140 may support proprietary protocols, standardized protocols, or a combination thereof. In one example, directory service 140 may be the same or similar to Microsoft® Active Directory® and may support client devices that run Microsoft Windows®, Linux®, other operating system, or a combination thereof. In another example, directory service 140 may be any directory service that supports a directory access protocol (DAP), such as the Lightweight Directory Access Protocol (LDAP). LDAP may be an industry standard application protocol for accessing and maintaining distributed directory information services in a vendor-neutral manner over an Internet Protocol (IP) network (e.g., network 102). In either example, directory service 140 may be provided to client devices 110 by one or more computing devices (e.g., management service 120).

The directory service database 150 may include one or more administrative units, such as administrative unit 151A and administrative unit 151B (also referred to herein as administrative unit 151). Objects, and/or data related thereto, such as object 152A and object 152B, may be stored within each administrative unit 151A and 151B, respectively. Additionally, the directory service database 150 stores user object-1 154A, user object-2 154B through user object-N 154N (also referred to collectively herein as user objects 154). The objects 152, 154, etc. associated with the directory service database 150 may be also or alternatively referred to as directory objects or domain objects. Objects may be typically electronic representations of real-world items that are used for network and resource identity and access management.

The directory service database 150, some or all directory objects, object properties or other directory data may be synchronized between the directory service database 150 and the configuration database 138 by the management service 120 creating a virtual version of the some or all of the directory service database 150 therein. These virtual versions of the directory (e.g., 151, 152, 154) objects may have additional data associated with them as determined by the management service 120. In some instances additional data may act as virtual attributes that can be accessed by the management service 120, but not by the directory service 140.

In some embodiments, objects 152 and 154 may be user account objects, computer account objects, an object container object, and the like. Additionally, groups of objects may be referred to herein as group objects. In some embodiments, the plurality of administrative units each include an administrative object that defines a set of member objects to which membership change actions are configured to be applied and/or enforced.

In some implementations, an object may be associated with an object identifier or one or more object identifiers (e.g., domain identifier combined with a user identifier). An object identifier may be any type of identification information and may include a universally unique identifier (UUID), globally unique identifier (GUID), other numeric or non-number identifier, or a combination thereof. The identification information may include binary, numeric, alphanumeric, non-numeric, other data, or a combination thereof. When a membership change occurs (also referred to herein as a membership access change or a membership change action), each of the change events in the directory service database 150 may be associated with or include information indicative of one or more domains, domain objects, changes, times, other information, or a combination thereof. The membership change action may indicate one or more object identifier and information indicative of one or more changes to the computing object. In one example, membership change action may be synchronization events and may include synchronization data used to keep different versions of a directory synchronized across multiple client devices 110. For example, membership change action may include making a change in an on-premise directory and then synchronizing those changes in a cloud-based directory.

Figure 2:
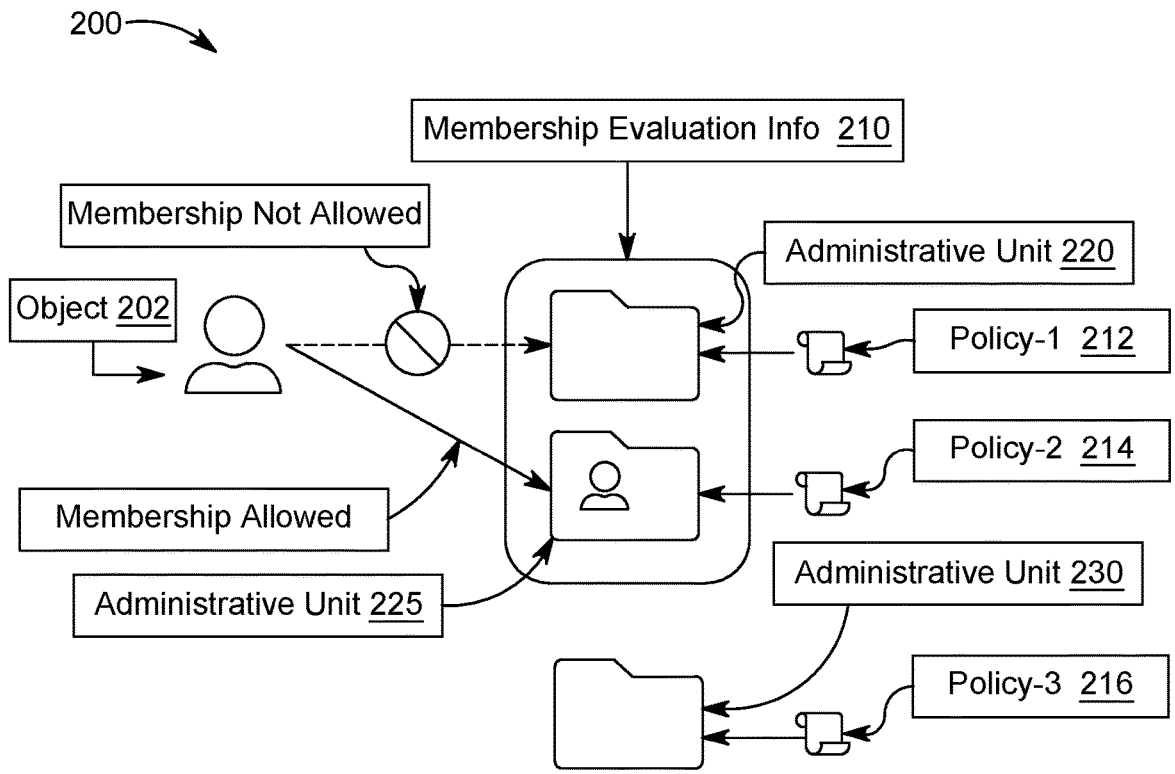
FIG. 2 illustrates an example of an administrative unit management process for a mutually exclusive membership, according to embodiments of the invention.

FIG. 2 illustrates an example environment 200 of an administrative unit management process for a mutually exclusive membership, according to embodiments of the invention. In an exemplary embodiment, administrative unit management process enforces mutually exclusive object memberships in or between administrative units such as administrative unit 220, administrative unit 225, and administrative unit 230 (e.g., administrative units 151A, 151B stored in the directory service database 150 of the directory service 140). For example, the administrative unit management process enforces mutually exclusive object memberships so that a member object 202 (or potential member) may have membership in one administrative unit (e.g., administrative unit 220) and in or between sets of administrative units (e.g., administrative unit 220 and administrative unit 225) based on the membership evaluation information 210. By allowing membership in only one administrative unit (e.g., "membership allowed" at administrative unit 225), security and/or operational policies (e.g., policy—1 212 and policy—2 214) can be applied to the particular administrative unit (e.g., "membership allowed" at administrative unit 225). The additional policies (e.g., policy—3 216) will only affect the member object(s) of that specific administrative unit (e.g., administrative unit 230). In some implementations, security or operational policies (e.g., policy—1 212, policy—2 214, policy—3 216, and the like) may include but are not limited to delegation of administrative rights over the members of each administrative unit and are also referred to herein as "roles". Further, rules may be utilized for enforcement of object settings that need to be applied to members of an administrative unit, also referred to herein as "rules" or "orchestrations" or "policies."

Figure 3:
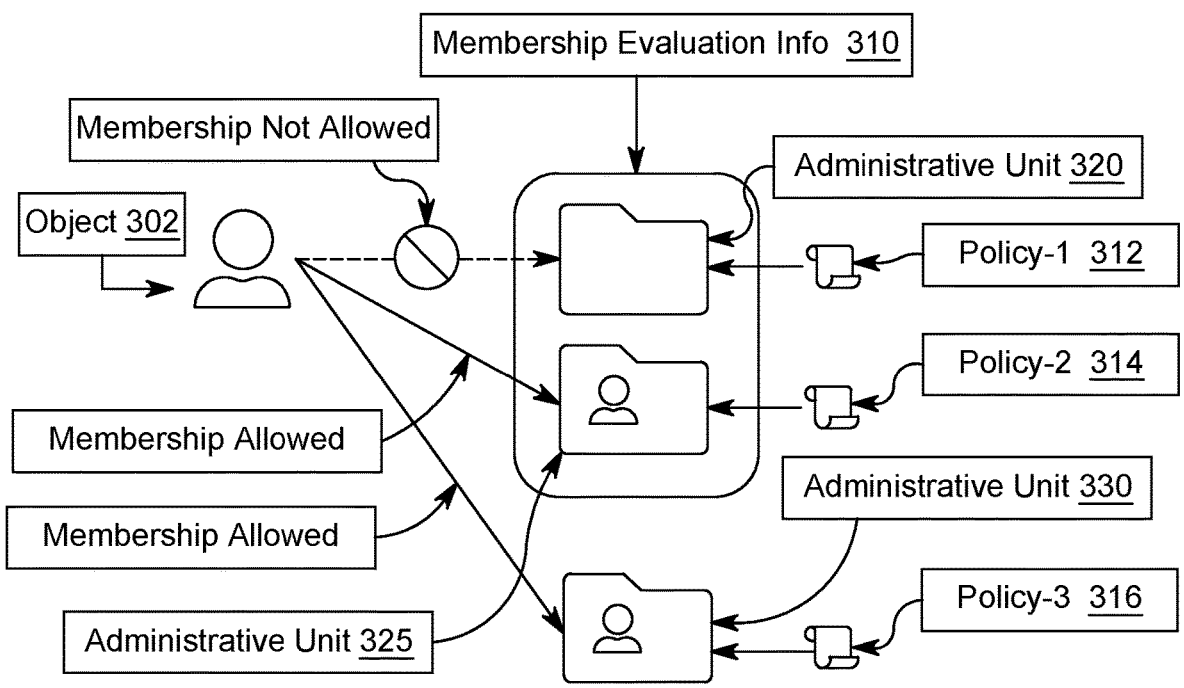
FIG. 3 illustrates an example of an administrative unit management process for a mutually exclusive and optional membership, according to embodiments of the invention.

FIG. 3 illustrates an example environment 300 of an administrative unit management process for a mutually exclusive and optional membership, according to embodiments of the invention. In an exemplary embodiment, administrative unit management process enforces mutually exclusive object memberships and optional memberships in or between sets administrative units such as administrative unit 320, administrative unit 325, and administrative unit 330 (e.g., administrative units 151A, 151B stored in the directory service database 150 of the directory service 140). For example, the administrative unit management process enforces mutually exclusive object memberships and optional memberships so that a member object 302 (or potential member) may have membership in one administrative unit (e.g., administrative unit 320) in or between sets of administrative units (e.g., administrative unit 320 and administrative unit 330) and an optional membership in one or more administrative units that do not require mutually exclusive memberships (e.g., administrative unit 330) based on the membership evaluation information 310. By allowing membership in only one administrative unit (e.g., "membership allowed" at administrative unit 325), security and/or operational policies (e.g., policy—2 314) can be applied and affect only the members of one administrative unit (e.g., administrative unit 325) in a mutually exclusive set of administrative units. The additional policy (e.g., policy—3 316) will only affect the member object(s) of that specific administrative unit (e.g., administrative unit 330). Member object (e.g., member object 302) that has membership in one administrative unit (e.g., administrative unit 325) from a mutually exclusive set of administrative units (e.g., administrative units 320 and 325) and membership in an optional non-mutually exclusive administrative unit (e.g., administrative unit 330) will be affected by policies (e.g., policies 314 and 314) applied to both administrative units where the member object has membership In some implementations, security or operational policies (e.g., policy—1 312, policy—2 314, policy—3 316, and the like) may include, but are not limited to, delegation of administrative rights over the members of each administrative unit, and are also referred to herein as "roles".

Figure 4:
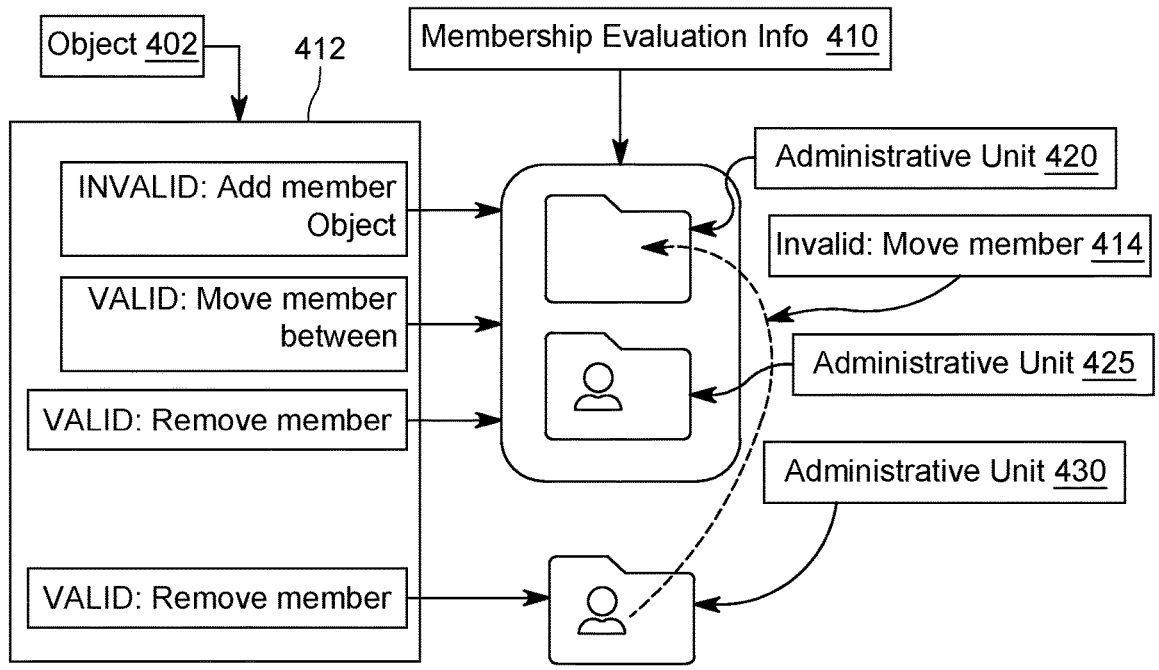
FIG. 4 illustrates an example of an administrative unit management process for allowing/denying membership change actions, according to embodiments of the invention.

FIG. 4 illustrates an example environment 400 of an administrative unit management process for allowing/denying membership change actions, according to embodiments of the invention. In an exemplary embodiment, administrative unit management process enforces membership change actions in or between sets administrative units such as administrative unit 420, administrative unit 425, and administrative unit 430 (e.g., administrative units 151A, 151B stored in the directory service database 150 of the directory service 140). For example, the administrative unit management process enforces membership change actions so that a member object 402 (or potential member) may have membership in one administrative unit in or between sets of administrative units (e.g., administrative unit 420, administrative unit 425, and administrative unit 430) and an optional membership in one or more sets of a cloud-based identity and access management service that do not require mutually exclusive memberships (e.g., administrative unit 430). A membership change action (e.g., element 412) may include valid object memberships, valid potential memberships, invalid object memberships, and/or invalid potential object memberships in and between one or more sets of administrative units (e.g., administrative unit 420, administrative unit 425, and administrative unit 430) based on the membership evaluation information 410. For example, as indicated by membership change action 414, a user object membership change request to move from administrative unit 430 to administrative unit 420 was determined to be "INVALID", thus the object membership move was automatically denied. In some implementations, changes to object memberships could potentially be performed by a user (e.g., IT administrator) from a client device 110 via application 112 connecting to the directory service database 150 via the management service 120 (e.g., cloud based) over a network connection. Alternatively, changes to object memberships could potentially be performed automatically through orchestration(s) performed by a management service instruction set (e.g., management service instruction set 130 of FIG. 1) based on some indicators including user object properties, changes to user object properties, through the user of an external data source, and the like.

Figure 5:
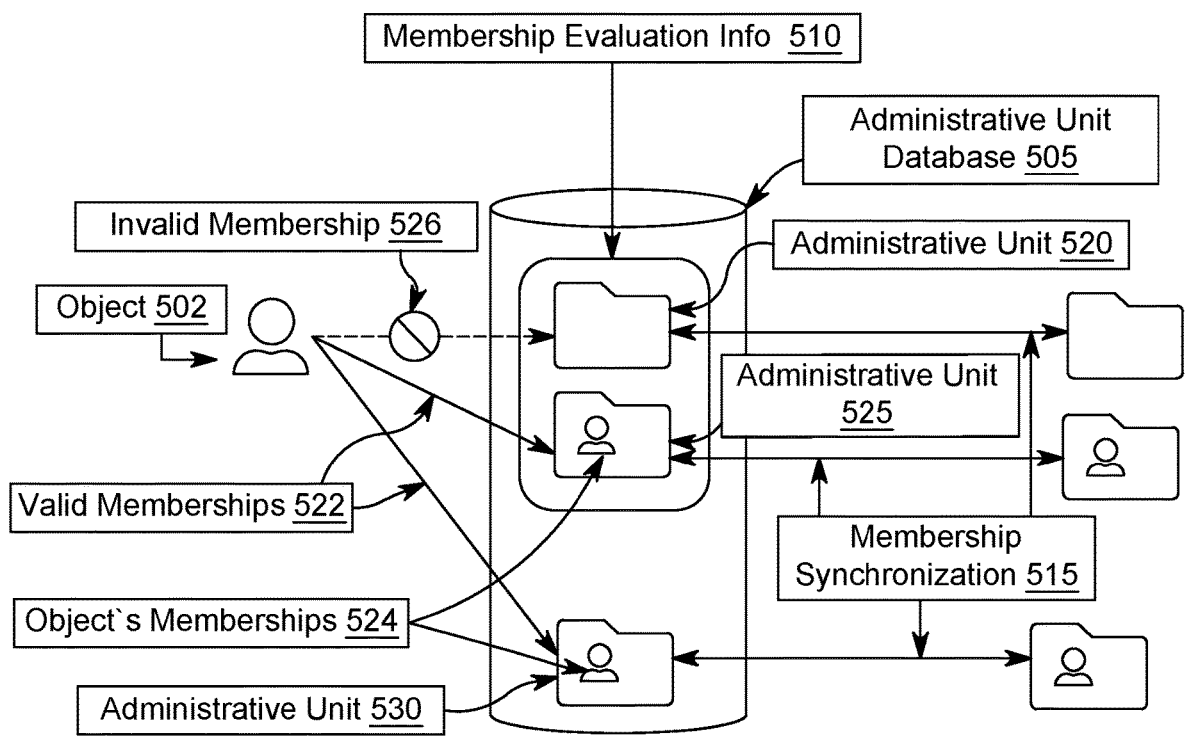
FIG. 5 illustrates an example of an administrative unit management process for managing membership changes via a database, according to embodiments of the invention.

FIG. 5 illustrates an example environment 500 of an administrative unit management process for managing membership changes via a database, according to embodiments of the invention. In an exemplary embodiment, administrative unit management process enforces membership change actions in or between sets virtual administrative units that are stored in an administrative unit database 505 (e.g., administrative units 151A, 151B stored in the directory service database 150 of the directory service 140). For example, a member object 502 (or potential member) may be determined to have an invalid membership (e.g., element 526) in a virtual administrative unit (e.g., administrative unit 520) in or between sets of a virtual administrative units (e.g., administrative unit 520, administrative unit 525, and administrative unit 530) based on the membership evaluation information 510. However, the member object 502 (or potential member) may be determined to have valid object memberships 524 (e.g., element 522) in a second virtual administrative unit (e.g., administrative unit 525) and an optional membership in one or more virtual administrative units that do not require mutually exclusive memberships (e.g., administrative unit 530). In some implementations, the administrative unit database 505 (e.g., configuration database 138) provides a communication protocol (e.g., membership synchronization 515) that synchronizes the membership action changes between sets of virtual administrative units (e.g., administrative unit 520, administrative unit 525, and administrative unit 530).

Figure 6:
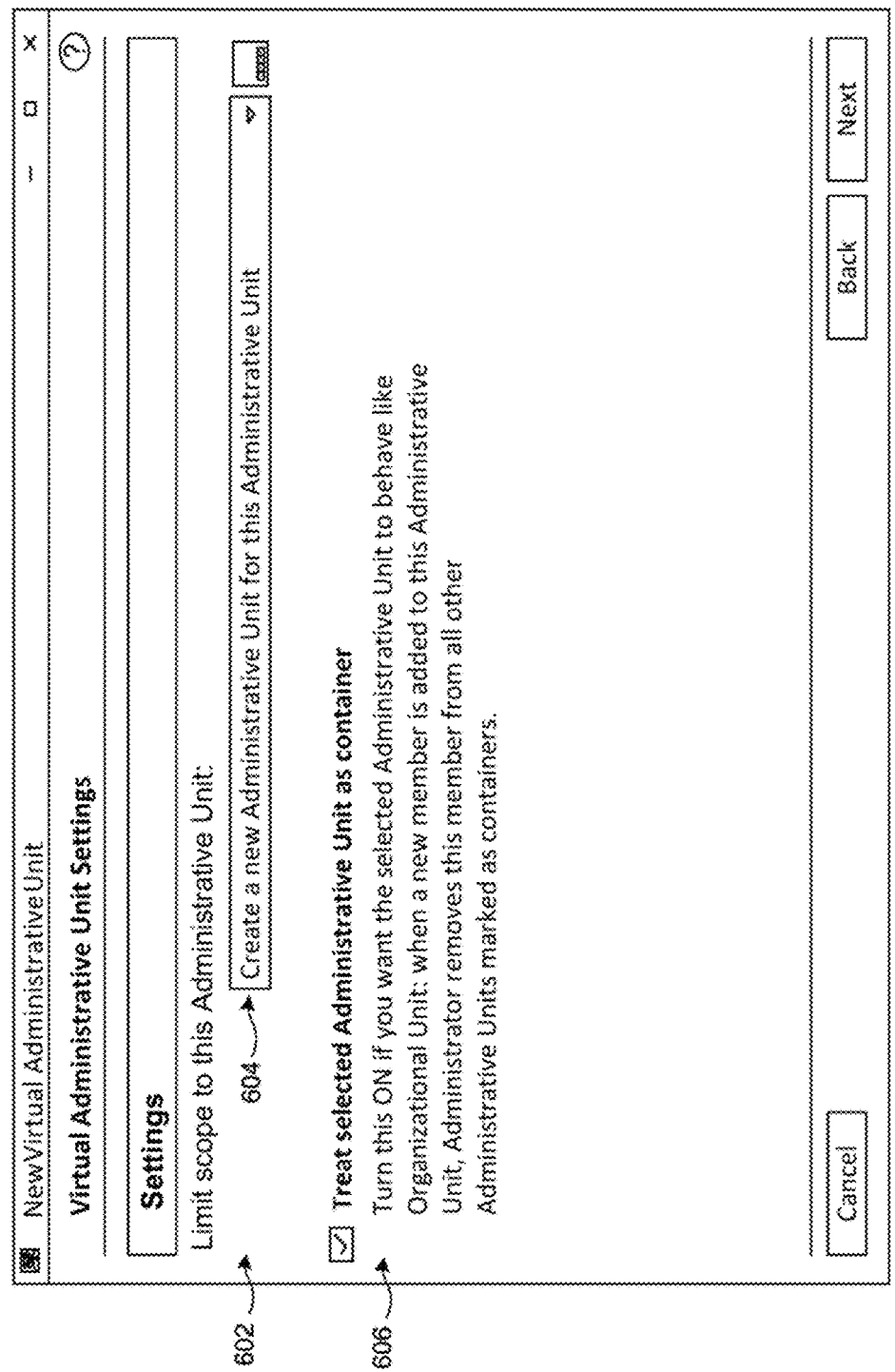
FIG. 6 illustrates an example screenshot of a management administrative user interface for configuring administrative units, according to embodiments of the invention.

FIG. 6 illustrates an example screenshot 600 for an administrative unit management processes via a management administrative user interface 602, according to embodiments of the invention. The example screenshot 600 illustrates an example data flow for a user (e.g., an IT administrator) to limit the scope for a particular administrative unit for configuration settings for one or more administrative units. For example, as illustrated in FIG. 6, the user can create a new administrative unit within the selected administrative unit (e.g., element 604). Additionally, the user can select the option to "Turn this ON if you want the selected Administrative Unit to behave like Organizational Unit: (e.g., in the set of mutually exclusive administrative units) when a new member is added to this Administrative Unit, Administrator (e.g., the management service) removes this member from all other Administrative Units marked as containers." (e.g., element 606).

Figure 7:
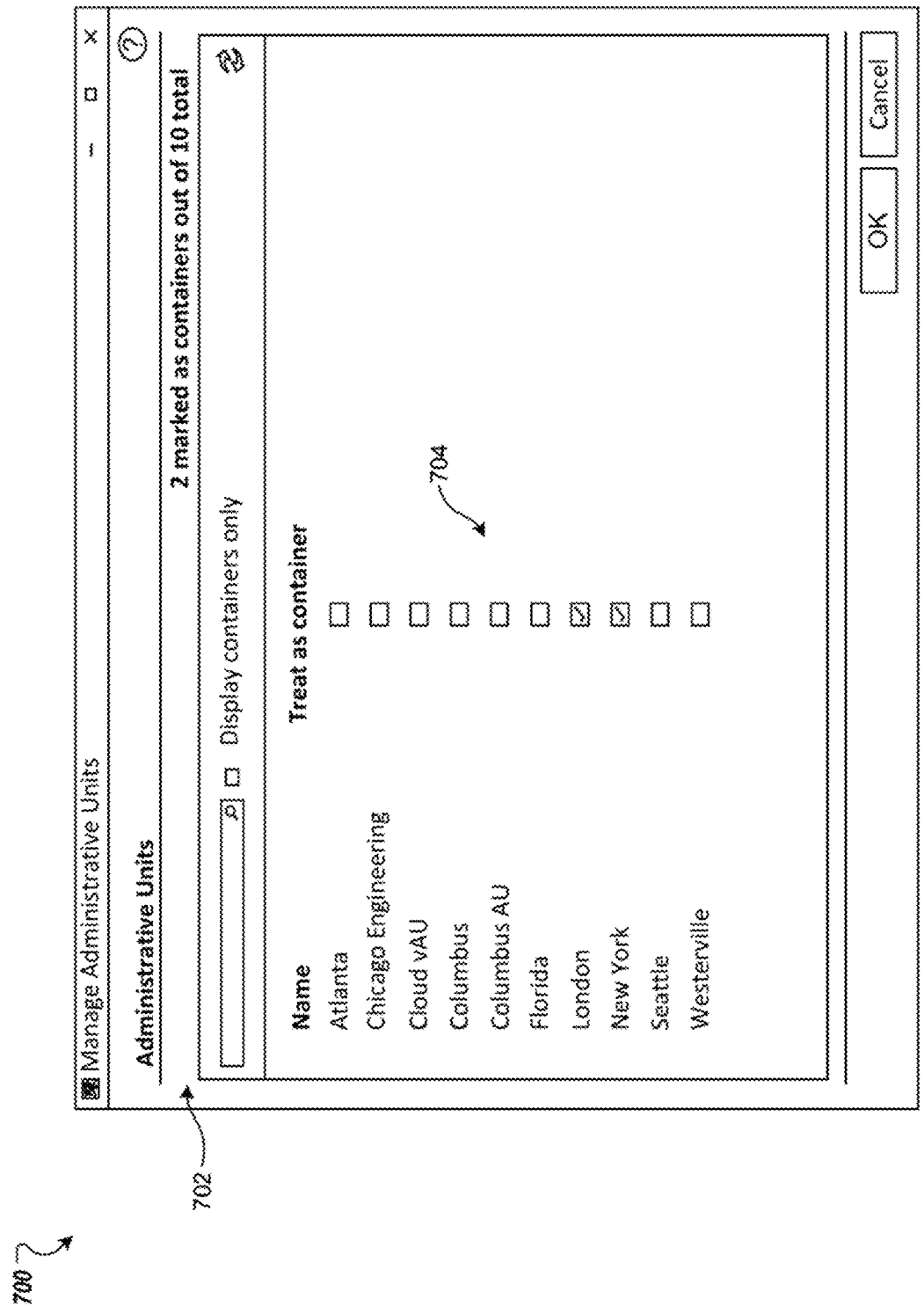
FIG. 7 illustrates an example screenshot of a management administrative user interface for configuring mutual exclusivity between administrative units, according to embodiments of the invention.

FIG. 7 illustrates an example screenshot 700 for an administrative unit management processes via a management administrative user interface 702, according to embodiments of the invention. The example screenshot 700 illustrates an example data flow for a user (e.g., an IT administrator) to configure mutual exclusivity between two or more particular administrative units for configuration settings (e.g., move a user between mutually exclusive memberships). For example, as illustrated in FIG. 7, the user selected to have the "London" and "New York" members to be mutually exclusive (e.g., element 704).

Figure 8:
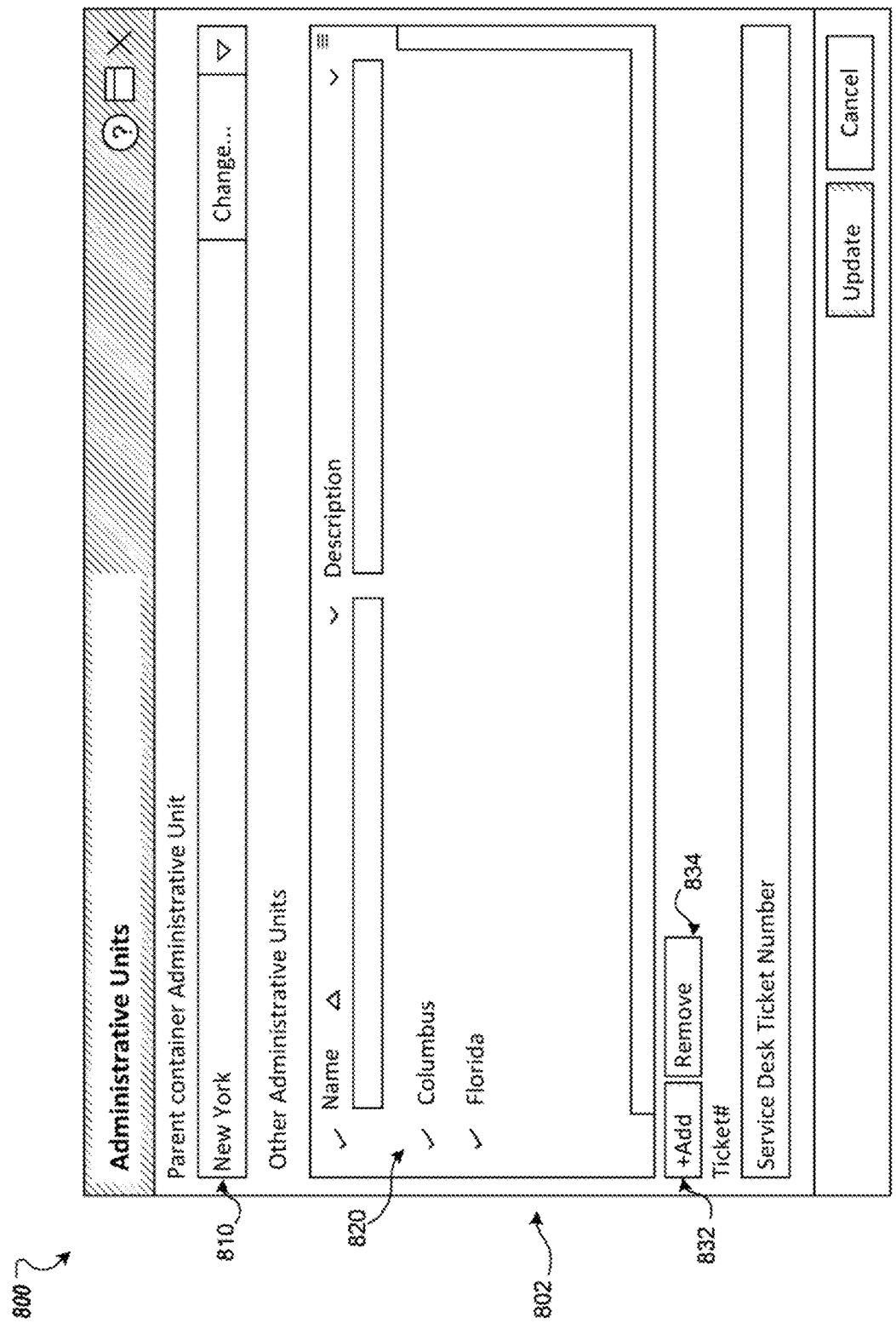
FIG. 8 illustrates an example screenshot of a management administrative user interface for initiating a user object membership management command for one or more administrative units, according to embodiments of the invention.

FIG. 8 illustrates an example screenshot 800 for an administrative unit management processes via a management administrative user interface 802, according to embodiments of the invention. The example screenshot 800 illustrates an example data flow for a user (e.g., an IT administrator) to select a parent container for one or more administrative units (e.g., view and manage mutually exclusive and non-mutually exclusive administrative unit memberships). For example, as illustrated in FIG. 8, the user can select a parent container for a new administrative unit within the selected administrative unit as a mutually exclusive membership (e.g., element 810). The use of a drop-down list control on the form simplifies the IT Administrator selection of only one administrative unit from the list of mutually exclusive admin units although this control type is optional since the management service 120 would enforce mutual exclusivity as well. Additionally, the user can select additional administrative units to be included within the selected parent container as non-mutually exclusive memberships (e.g., element 820). In some implementations, additional controls allowing the IT administrator to add or remove administrative units that are not listed as mutually exclusive to the user memberships (e.g., Add button 832 and Remove button 834).

FIG. 9 illustrates an example screenshot 900 for an administrative unit management processes via a management administrative user interface 902, according to embodiments of the invention. The example screenshot 900 illustrates an example data flow for a user (e.g., an IT administrator) for receiving a conflict resolution notification during a user object membership management command after selecting a parent container for one or more administrative units in FIG. 8 (e.g., showing a user's membership conflict when the user/object is a member of two or more administrative units with mutually exclusive memberships). For example, as illustrated in FIG. 9, a conflict resolution notification (e.g., element 910) is provided to the user that states: "This object is located in multiple container Administrative Units. Click 'Change . . . ' button below to select a single Administrative Unit as a parent."

Figure 10:
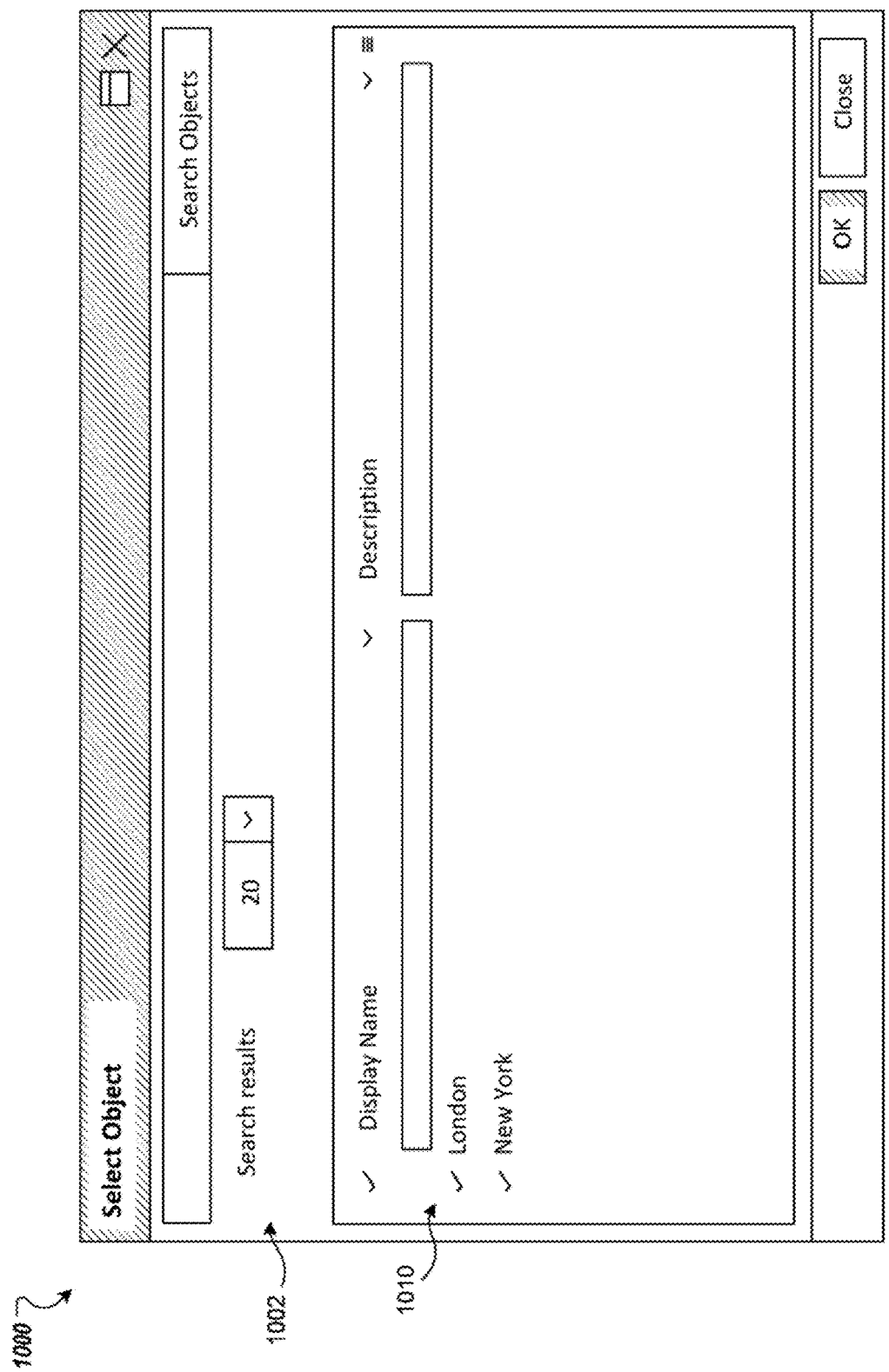
FIG. 10 illustrates an example screenshot of a management administrative user interface for configuring mutual exclusivity between administrative units, according to embodiments of the invention.

FIG. 10 illustrates an example screenshot 1000 for an administrative unit management processes via a management administrative user interface 1002, according to embodiments of the invention. The example screenshot 1000 illustrates an example data flow for a user (e.g., an IT administrator) to select a move management command for one or more administrative units (e.g., move user between administrative units with mutually exclusive memberships). For example, as illustrated in FIG. 10, the user is shown the administrative units (e.g., London and New York) that include a mutually exclusive membership for that particular container (e.g., element 1010).

Figure 11:
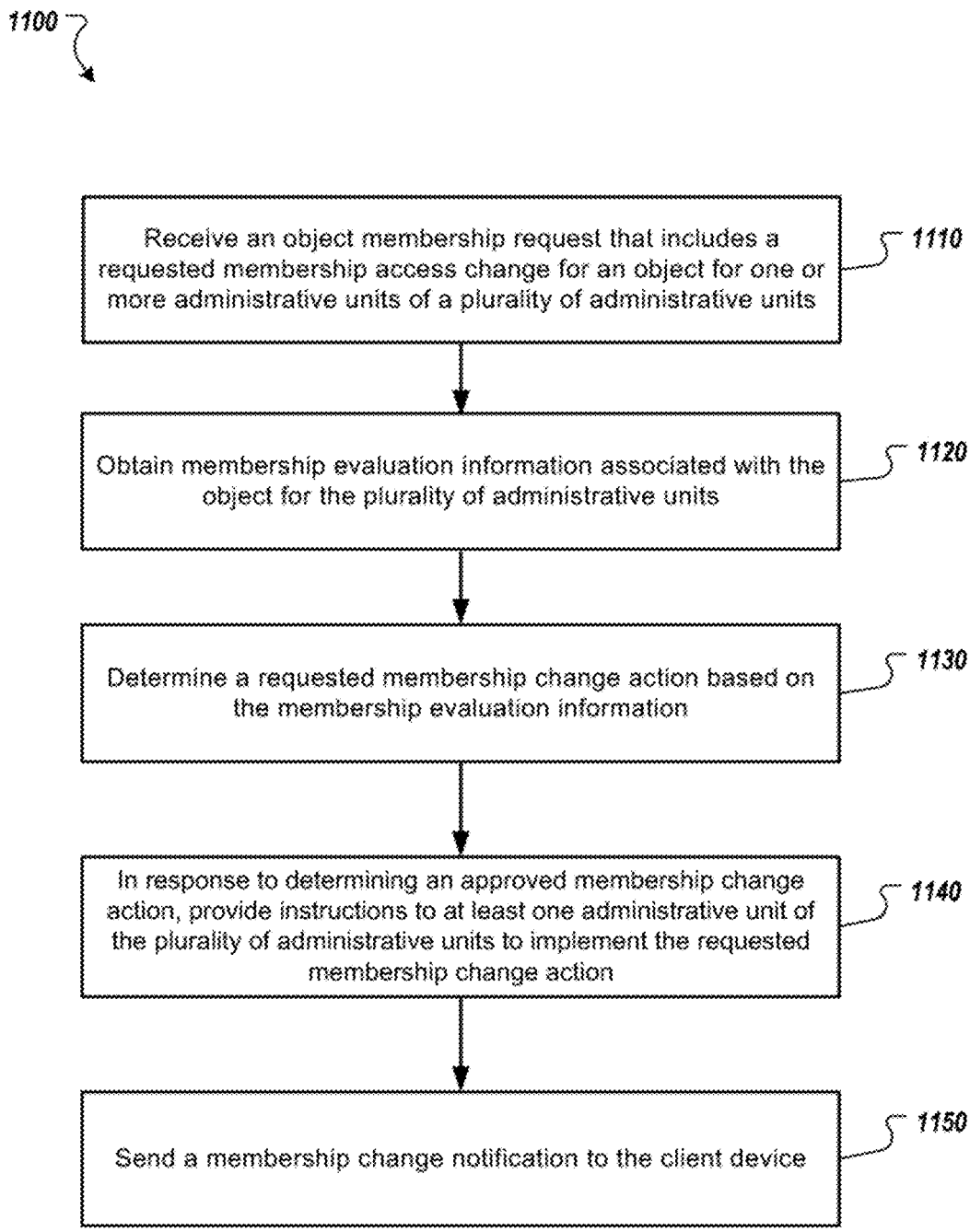
FIG. 11 is a flowchart of an example administrative unit management process, according to embodiments of the invention.
Figure 12:
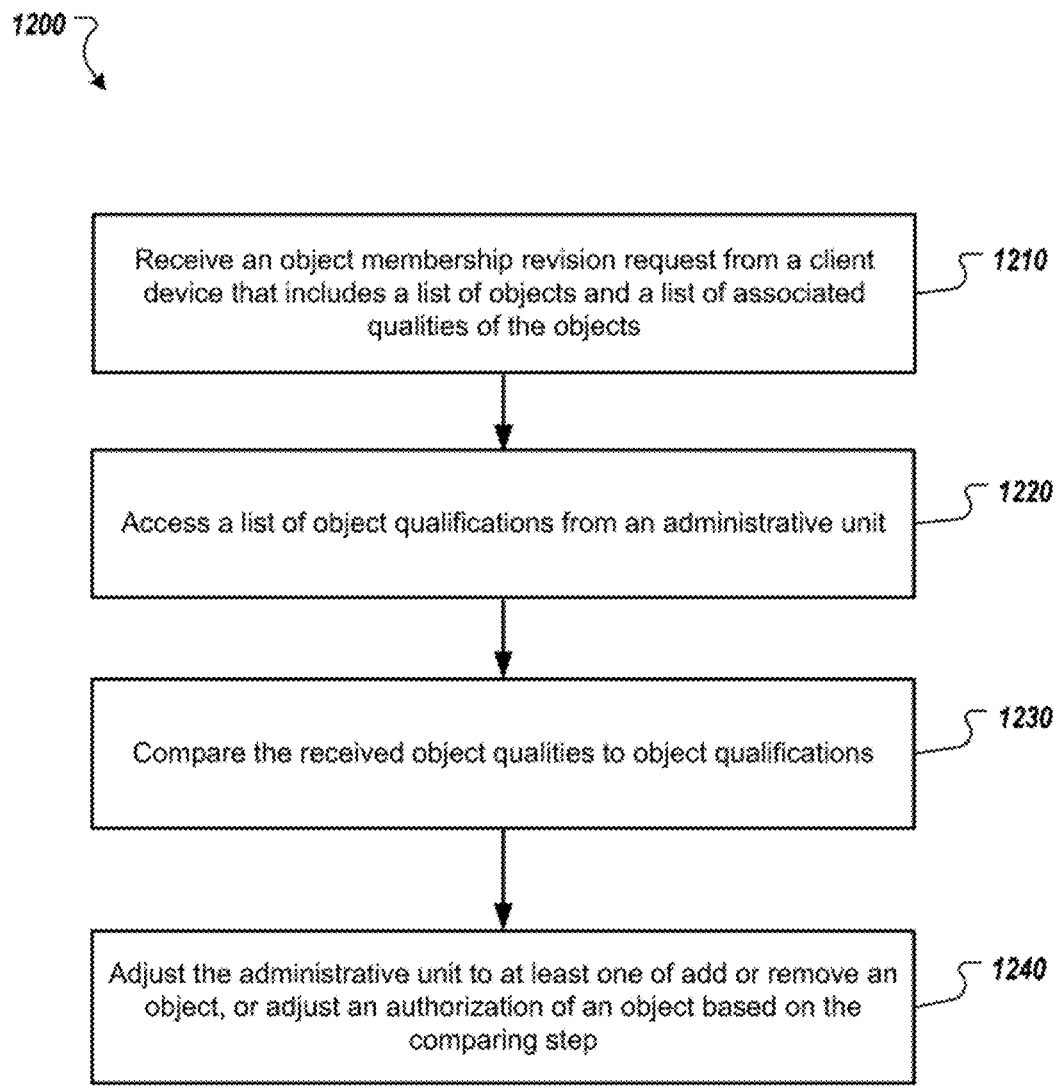
FIG. 12 is a flowchart of adjusting an administrative unit based on an object membership revision request, according to embodiments of the invention.

An example process of implementing an administrative unit management protocol as illustrated in FIGS. 2-10 is further discussed herein with reference to processes 1100 and 1200 of FIGS. 11 and 12, respectively.

FIG. 11 illustrates a flowchart of an example process 1100 for implementing an administrative unit management process, according to embodiments of the invention. Operations of the process 1100 can be implemented, for example, by a system that includes one or more data processing apparatus, such as management service 120 of FIG. 1 utilizing a management service instruction set 130. The process 1100 can also be implemented by instructions stored on computer storage medium, where execution of the instructions by a system that includes a data processing apparatus cause the data processing apparatus to perform the operations of the process 1100.

The system receives an object membership request that includes a membership access change for an object for one or more administrative units of a plurality of administrative units (1110). For example, a client device (e.g., client device 110 via application 112) sends a request to the management service 120 to add/move/remove an object/user between memberships (e.g., location (London), department (Engineering), etc.). In some embodiments, the management service is hosted by a cloud-based management server and accessed by the client device (e.g., through a web portal or a console) based on the client device including correct permissions.

In some embodiments of the invention, the set of objects may or may not have mutual exclusivity with other management scopes to which roles, rules, or orchestrations can be applied and enforced by management service 120 in communication with the directory service database 150 of the directory service 140. In some embodiments, objects may be user account objects, computer account objects, an object container object, and the like. Additionally, groups of objects may be referred to herein as group objects. In some embodiments, the plurality of administrative units each include an administrative object that defines a set of member objects to which membership change actions are configured to be applied and/or enforced.

The system obtains membership evaluation information associated with the object from a directory service for the plurality of administrative units (1120). For example, the management service 120 receives security or operational policies from the administrative units (e.g., administrative units 151A, 151B, etc.). The security or operational policies may include delegation of administrative rights over the members of a particular administrative unit. For example, "roles" may include enforcement of settings associated that need to be applied to members of a particular administrative unit. Additionally, "rules" or "IT policies" may also be included as part of the security or operational policies as discussed herein.

In some implementations, the membership evaluation information is obtained from a directory service, a file, or a management service configuration database. For example, the membership evaluation information may be obtained from the directory service 140. Alternatively, the membership evaluation information may be obtained from the management service 120, such as a file store stored locally on a management administrative server that hosts the management service, or the membership evaluation information may be obtained from a management configuration database (e.g., configuration database 138). In some implementations of the invention, the membership evaluation information is obtained during, or prior to, the evaluation of the membership change actions.

The system determines a requested membership change action based on the membership evaluation information (1130). For example, the management service 120 determines whether there are mutually exclusive memberships between administrative units. The management service 120 determines whether to allow or deny changes, including but not limited to, valid object memberships and valid potential memberships and invalid object memberships and invalid potential object memberships in and between one or more sets of administrative units.

In some implementations of the invention, determining membership change action based on the membership evaluation information includes determining to delegate administrative rights to the one or more objects for one or more administrative units. Alternatively, membership/rule evaluation information for purposes of delegation may be performed with delegation "roles" whereby permission delegation is assigned to a user ahead of time such that rule information for delegation could be optional. Thus, in some implementations of the invention, determining membership change action based on the membership evaluation information is based on permission roles and assigning permission delegation to a user.

In response to determining an approved membership change action, the management service provides instructions to the directory service to implement the requested membership change action (1140) and sends a membership change notification to the client device (e.g., via the management administrative user interface) (1150). For example, the management service 120 enforces mutually exclusive memberships. In some implementations of the invention, the management service 120 provides synchronization of virtual membership change between the configuration database 138 and the administrative units (e.g., administrative units 151) stored in directory service database 150

In some implementations of the invention, determining membership change action based on the membership evaluation information includes determining to remove access to one of the administrative units for the object. In some implementations of the invention, determining membership change action based on the membership evaluation information includes determining to provide access to another administrative unit for the object.

In some implementations of the invention, the membership change action includes a membership conflict between the object and includes associated with the object corresponding to another administrative unit. In some implementations of the invention, the process 1100 further includes displaying on a user interface at the client device a membership conflict resolution notification for the membership conflict. For example, as illustrated in FIG. 9, a conflict resolution notification (e.g., element 910) is provided to the user that states: "This object is located in multiple container Administrative Units. Click 'Change . . . ' button below to select a single Administrative Unit as a parent" or other similar message or content.

In some implementations of the invention, in response to receiving the membership change action, the directory service is configured to distribute the membership change action to each of the plurality of administrative units. For example, as illustrated in a FIG. 5 with reference to membership synchronization 515, synchronization occurs after (or during) the membership action changes between sets of administrative units (e.g., administrative unit 520 and administrative unit 530). The membership action change is synchronized across the plurality of administrative units (e.g., administrative unit 151A, administrative unit 151B, etc.) within the directory service database 150 controlled within the directory service 140.

In some implementations of the invention, the process 1100 further includes tracking membership change results associated with the membership change action in a management configuration database. For example, the configuration database 138 stores configuration and other data such as virtual administrative unit data, orchestration data, rules and roles, and other information that is used by management service (e.g., management service instruction set 130) to formulate how management service should complete tasks. In some implementations of the invention, the process 1100 further includes reversing one or more of the membership change actions to each of the plurality of administrative units based on the tracked membership change results.

FIG. 12 illustrates a flowchart of an example process 1200 for implementing an administrative unit management process, according to embodiments of the invention. Operations of the process 1200 can be implemented, for example, by a system that includes one or more data processing apparatus, such as management service 120 of FIG. 1 utilizing a management service instruction set 130. The process 1200 can also be implemented by instructions stored on computer storage medium, where execution of the instructions by a system that includes a data processing apparatus cause the data processing apparatus to perform the operations of the process 1200.

The system receives an object membership revision request from a client device that includes a list of objects and a list of associated qualities of the objects (1210). For example, a client device (e.g., client device 110 via application 112) sends a request to the management service 120 to add/move/remove an object/user between memberships (e.g., location (London), department (Engineering), etc.). In some embodiments of the invention, the set of objects may or may not have mutual exclusivity with other management scopes to which roles, rules, or orchestrations can be applied and enforced by management service 120 in communication with the directory service database 150 of the directory service 140. In some embodiments, the management service is hosted by a cloud-based management server and accessed by the client device (e.g., through a web portal or a console) based on the client device including correct permissions.

In some embodiments of the invention, the set of objects may or may not have mutual exclusivity with other management scopes to which roles, rules, or orchestrations can be applied and enforced by management service 120 in communication with the directory service database 150 of the directory service 140. In some embodiments, objects may be user account objects, computer account objects, an object container object, and the like. Additionally, groups of objects may be referred to herein as group objects. In some embodiments, the plurality of administrative units each include an administrative object that defines a set of member objects to which membership change actions are configured to be applied and/or enforced.

The system accesses a list of object qualifications from an administrative unit (1220). For example, the management service 120 receives security or operational policies from the administrative units (e.g., administrative units 151A, 151B, etc.). The security or operational policies may include delegation of administrative rights over the members of a particular administrative unit. For example, "roles" may include enforcement of settings associated that need to be applied to members of a particular administrative unit. Additionally, "rules" or "IT policies" may also be included as part of the security or operational policies as discussed herein.

The system compares the received object qualities to object qualifications (step 1230). For example, the management service 120 determines whether there are mutually exclusive memberships between administrative units. The management service 120 determines whether to allow or deny changes, including but not limited to, valid object memberships and valid potential memberships and invalid object memberships and invalid potential object memberships in and between one or more sets of a (cloud-based) identity and administrative units.

The system adjusts the administrative unit to at least one of add or remove an object or adjust an authorization of an object based on the comparing step 1230 (1240). In some implementations, the process 1200 further includes sending a membership change notification to the client device (via the management administrative user interface). For example, the management service 120, enforces mutually exclusive memberships. In some implementations of the invention, the management service 120 provides synchronization membership change between the database and the active directory administrative units (e.g., administrative units 141).

Figure 13:
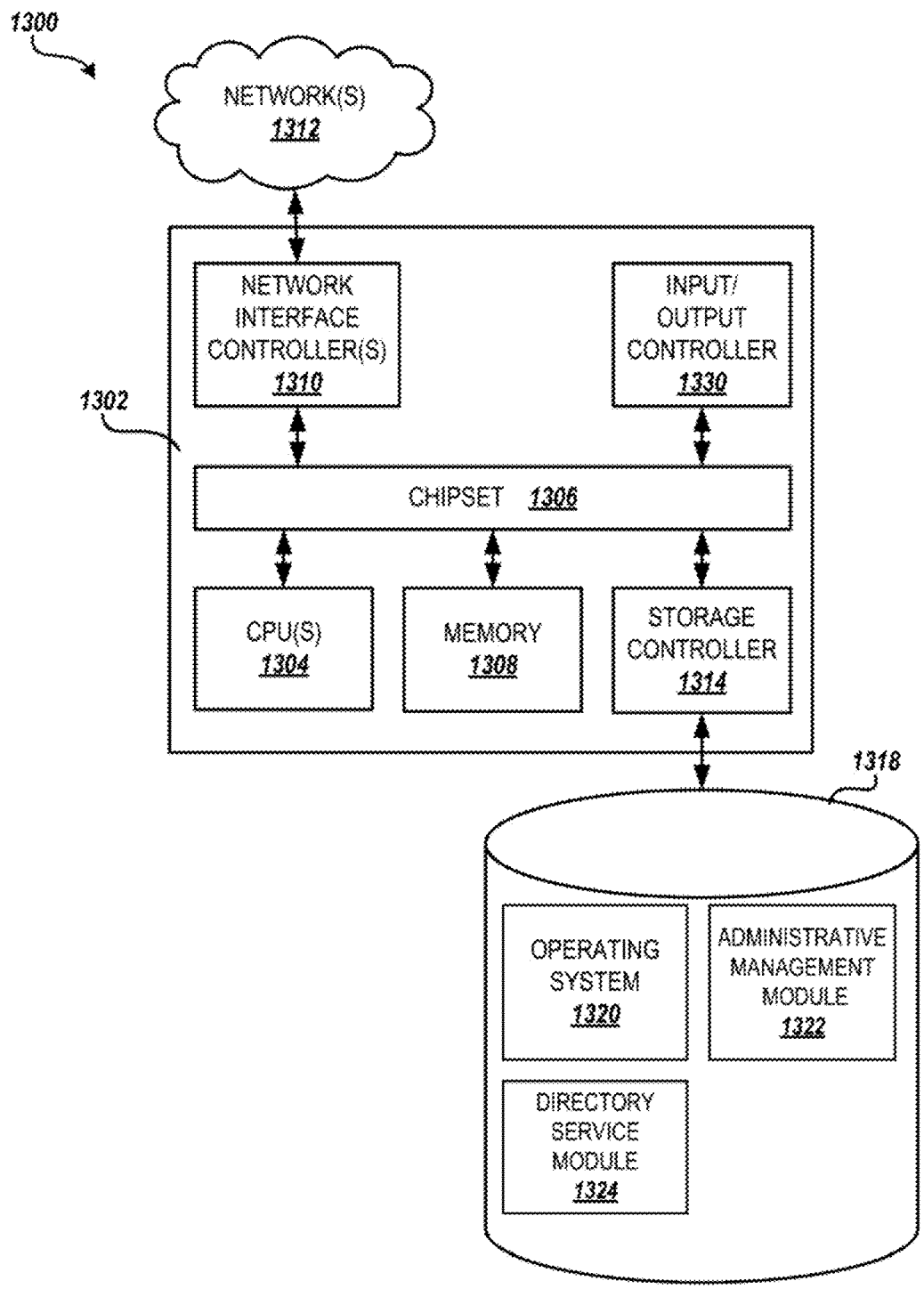
FIG. 13 is a block diagram showing an example computer architecture for a computer capable of executing the software components described herein, according to embodiments described herein.

FIG. 13 illustrates an example computer architecture 1300 for a computer 1302 capable of executing the software components described herein for the sending/receiving and processing of tasks. The computer architecture 1300 (also referred to herein as a "server") shown in FIG. 13 illustrates a server computer, workstation, desktop computer, laptop, a server operating in a cloud environment, or other computing device, and may be utilized to execute any aspects of the software components presented herein described as executing on a host server, or other computing platform. The computer 1302 preferably includes a baseboard, or "motherboard," which is a printed circuit board to which a multitude of components or devices may be connected by way of a system bus or other electrical communication paths. In one illustrative embodiment, one or more central processing units (CPUs) 1304 operate in conjunction with a chipset 1306. The CPUs 1304 can be programmable processors that perform arithmetic and logical operations necessary for the operation of the computer 1302.

The CPUs 1304 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1306 provides an interface between the CPUs 1304 and the remainder of the components and devices on the baseboard. The chipset 1306 may provide an interface to a memory 1308. The memory 1308 may include a random-access memory (RAM) used as the main memory in the computer 1302. The memory 1308 may further include a computer-readable storage medium such as a read-only memory (ROM) or non-volatile RAM (NVRAM) for storing basic routines that that help to startup the computer 1302 and to transfer information between the various components and devices. The ROM or NVRAM may also store other software components necessary for the operation of the computer 1302 in accordance with the embodiments described herein.

According to various embodiments, the computer 1302 may operate in a networked environment using logical connections to remote computing devices through one or more networks 1312, a local-area network (LAN), a wide-area network (WAN), the Internet, or any other networking topology known in the art that connects the computer 1302 to the devices and other remote computers. The chipset 1306 includes functionality for providing network connectivity through one or more network interface controllers (NICs) 1310, such as a gigabit Ethernet adapter. For example, the NIC 1310 may be capable of connecting the computer 1302 to other computer devices in the utility provider's systems. It should be appreciated that any number of NICs 1310 may be present in the computer 1302, connecting the computer to other types of networks and remote computer systems beyond those described herein.

The computer 1302 may be connected to at least one mass storage device 1318 that provides non-volatile storage for the computer 1302. The mass storage device 1318 may store system programs, application programs, other program modules, and data, which are described in greater detail herein. The mass storage device 1318 may be connected to the computer 1302 through a storage controller 1314 connected to the chipset 1306. The mass storage device 1318 may consist of one or more physical storage units. The storage controller 1314 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 1302 may store data on the mass storage device 1318 by transforming the physical state of the physical storage units to reflect the information being stored.

The specific transformation of physical state may depend on various factors, in different embodiments of the invention of this description. Examples of such factors may include, but are not limited to, the technology used to implement the physical storage units, whether the mass storage device 1318 is characterized as primary or secondary storage, or the like. For example, the computer 1302 may store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1302 may further read information from the mass storage device 1318 by detecting the physical states or characteristics of one or more particular locations within the physical storage units.

The mass storage device 1318 may store an operating system 1320 utilized to control the operation of the computer 1302. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 1318 may store other system or application programs and data utilized by the computer 1302, such as administrative management module 1322 to orchestrate the administrative unit management process, and a directory service module 1324 for locating, managing, administering, and organizing computing objects of a computing environment, according to embodiments described herein. Other system or application programs and data utilized by the computer 1302 may be provided as well (e.g., a payment processing module, a security module, a user interface module, etc.).

In some embodiments, the mass storage device 1318 may be encoded with computer-executable instructions that, when loaded into the computer 1302, transforms the computer 1302 from being a general-purpose computing system into a special-purpose computer capable of implementing the embodiments described herein. These computer-executable instructions transform the computer 1302 by specifying how the CPUs 1304 transition between states, as described above. According to some embodiments, from the management service 120 perspective, the mass storage device 1318 stores computer-executable instructions that, when executed by the computer 1302, perform portions of the process 1100 or process 1200, for implementing a simulation system, as described herein. In further embodiments, the computer 1302 may have access to other computer-readable storage medium in addition to or as an alternative to the mass storage device 1318.

The computer 1302 may also include an input/output controller 1330 for receiving and processing input from a number of input devices, such as a keyboard, a mouse, a touchpad, a touch screen, an electronic stylus, or other type of input device. Similarly, the input/output controller 1330 may provide output to a display device, such as a computer monitor, a flat-panel display, a digital projector, a printer, a plotter, or other type of output device. It will be appreciated that the computer 1302 may not include all of the components shown in FIG. 13, may include other components that are not explicitly shown in FIG. 13, or may utilize an architecture completely different than that shown in FIG. 13.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:
   at a processor of a device:
   obtaining membership data for a plurality of objects associated with a plurality of administrative units, wherein the plurality of administrative units comprises a first set of administrative units that enforce mutually exclusive object memberships and a second set of administrative units that do not enforce mutually exclusive object memberships;
   identifying, at a management service and based on the membership data, a membership access change for at least one object of the plurality of objects for one or more administrative units of the plurality of administrative units;
   obtaining, at the management service, membership evaluation information associated with the at least one object;
   determining, at the management service, a membership change action for the at least one object based on the membership evaluation information, wherein determining the membership change action for the at least one object based on the membership evaluation information is based on permission roles and assigning permission delegation to a user;
   in response to determining an approved membership change action, providing instructions to at least one administrative unit of the plurality of administrative units to implement the membership change action for the at least one object of the plurality of objects; and
   sending a membership change notification to a client device.

2. The method of claim 1, wherein determining the membership change action for the at least one object based on the membership evaluation information comprises determining to delegate administrative rights to one or more objects of the plurality of objects for a particular administrative unit.

3. The method of claim 1, wherein determining the membership change action for the at least one object based on the membership evaluation information comprises determining to remove access to one of the administrative units for the at least one object.

4. The method of claim 1, wherein determining the membership change action for the at least one object based on the membership evaluation information comprises determining to provide access to another administrative unit for the at least one object.

5. The method of claim 1, wherein the membership change action comprises a membership conflict between the at least one object and memberships associated with the at least one object corresponding to another administrative unit.

6. The method of claim 5, further comprising displaying on a user interface at the client device a membership conflict resolution notification for the membership conflict.

7. The method of claim 1, wherein in response to receiving the membership change action, the management service is configured to distribute the membership change action to each of the plurality of administrative units.

8. The method of claim 1, wherein the membership evaluation information is obtained from a directory service, a file, or a management service configuration database.

9. The method of claim 1, wherein the membership evaluation information is obtained during, or prior to, the evaluation of the membership change actions.

10. The method of claim 1, further comprising:
    tracking membership change results associated with the membership change action in a management configuration database.

11. The method of claim 10, further comprising:
    reversing one or more of the membership change actions to one or more object for each of the plurality of administrative units based on the tracked membership change results.

12. The method of claim 1, wherein the at least one object comprises a user account object, a computer account object, one of a group of objects, an object container object, or a combination thereof.

13. The method of claim 1, wherein the plurality of administrative units each comprise an administrative object that defines a set of member objects to which membership change actions are configured to be applied and/or enforced.

14. The method of claim 1, wherein the management service is hosted by a cloud-based management server and accessed by the client device based on the client device comprising permissions to access the cloud-based management server.

15. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the one or more processors to perform operations comprising:

obtaining membership data for a plurality of objects associated with a plurality of administrative units, wherein the plurality of administrative units comprises a first set of administrative units that enforce mutually exclusive object memberships and a second set of administrative units that do not enforce mutually exclusive object memberships;

identifying, at a management service and based on the membership data, a membership access change for at least one object of the plurality of objects for one or more administrative units of the plurality of administrative units;

obtaining, at the management service, membership evaluation information associated with the at least one object;

determining, at the management service, a membership change action based on the membership evaluation information, wherein determining the membership change action for the at least one object based on the membership evaluation information is based on permission roles and assigning permission delegation to a user;

in response to determining an approved membership change action, providing instructions to at least one administrative unit of the plurality of administrative units to implement the membership change action for the at least one object of the plurality of objects; and sending a membership change notification to a client device.

16. The method of claim 1, wherein, in response to determining an approved membership change action, providing instructions to a first administrative unit of the first set of administrative units and a first administrative unit of the second set of administrative units to implement the membership change action, and providing instructions to a second administrative unit of the first set of administrative units to deny the membership change action.

17. The method of claim 1, wherein determining the membership change action for the at least one object based on the membership evaluation information comprises determining that there are mutually exclusive memberships between two or more administrative units.

* * * * *